United States Patent [19]
Gaston

[11] Patent Number: 6,055,736
[45] Date of Patent: May 2, 2000

[54] LOCATING DEVICE FOR USE WITH DRYWALL

[76] Inventor: Claire F. Gaston, 601 11$^{th}$ St., Lincoln, Ill. 62656-1981

[21] Appl. No.: 09/094,283

[22] Filed: Jun. 9, 1998

[51] Int. Cl.$^7$ .............................. B25H 7/04; G01B 5/14
[52] U.S. Cl. ........................ 33/528; 33/DIG. 10; 33/613
[58] Field of Search .............................. 33/528, DIG. 10, 33/613, 562, 370, 371, 372

[56] References Cited

U.S. PATENT DOCUMENTS

| | | | |
|---|---|---|---|
| 2,788,151 | 1/1957 | Shore | 33/528 |
| 3,522,658 | 5/1970 | Howell | 33/528 |
| 3,842,510 | 10/1974 | Elliott | 33/528 |
| 4,126,941 | 11/1978 | Clark | 33/528 |
| 4,209,103 | 6/1980 | Glovier | 33/528 |
| 4,750,271 | 6/1988 | Ericksen | 33/613 |
| 4,802,284 | 2/1989 | Jackson | 33/528 |

Primary Examiner—Diego Gutierrez
Assistant Examiner—Faye Francis
Attorney, Agent, or Firm—G. Brian Pingel

[57] ABSTRACT

A locator pin device is provided for locating a utility box behind a covering member such as drywall. The device removeably attaches to a utility box and, when attached, positions a locator pin or pins in an outward direction from the utility box. The locator pin or pins have a long shaft and tip that protrude partially or completely through the covering member when the covering member is placed over the utility box. A template may then be used to mark the location of the utility box so that an access opening may be cut in the covering member. The device allows exact location of a utility box behind a covering member.

9 Claims, 5 Drawing Sheets a.   b.

a.                                  b.

LOCATING DEVICE FOR USE WITH DRYWALL

BACKGROUND OF THE INVENTION

1. Field of the Invention

The present invention relates in general to a locating device for use with a covering member, such as drywall or a construction panel and, more specifically, to a means for locating the position of a utility box located behind such covering member. The utility box includes utility structures such as an electrical outlet box, cable TV outlet box, light socket, junction box, computer cable service box, telephone jack box and the like.

2. Description of the Prior Art

A variety of devices are known for locating the exact position of utility boxes disposed behind a covering member. The purpose of determining the location of the utility box is to identify where, relative to the utility box, an access opening is to be formed in the covering member. In this manner, when the covering member is positioned and installed over the utility box, access thereto is provided through an opening in the covering member. In the case of an electrical utility box, a precisely defined access opening permits installation of an electrical switch or outlet after the construction panel has been installed. In the case of other utility structures, an access opening permits installation of computer and TV cables, telephone jacks and the like in a functionally similar manner.

In connection with such a general method, the variety of prior art devices are designed to improve the ability for locating an access opening, for example, see U.S. Pat. No. 2,775,812 to Mohr; U.S. Pat. No. 3,888,013 to Benoit, U.S. Pat. No. 4,059,905 to Wieting; U.S. Pat. No. 4,202,388 to Wieting; U.S. Pat. No. 5,040,304 to Jackson; U.S. Pat. No. 5,129,297 to Bussi; and U.S. Pat. No. 5,172,483 to Yocono, Sr. et. al. While each of these prior art devices permits location of a utility box behind a covering member, they each suffer from significant shortcomings and drawbacks.

In particular, prior art structures require attachment to the utility box by positioning pins into the box face plate mounting holes. However, due to variations in design and mounting hole spacing among utility boxes these devices are less than satisfactory. This method of attaching the locator device to the utility box is cumbersome, time consuming and can result in an insecure attachment. Similarly, locator devices that slide to accommodate variable pin length are expensive to manufacture and cumbersome to use.

U.S. Pat. No. 2,775,812 discloses a single pin structure that is clipped to a utility box. The single clip pin structure, even if two separate clip pins are used, is less stable and more cumbersome than the present invention.

Thus, there is a clear need in the construction art for a method and device for locating utility boxes without the accompanying shortcomings and drawbacks of the prior art methods and devices. Accordingly, it is a primary object of the present invention to provide a method and device for locating the exact position of utility structures behind a covering member, in a way that overcomes the shortcomings and drawbacks of prior art methods and devices.

It is a further object of the present invention to provide such device in the form of a locator pin device that can be quickly and easily attached to and removed from the utility box.

It is a further object of the present invention to provide for a template that can be used with such device to guide a cutting tool to cut an access opening in the covering member. This will allow access to the utility box with the covering member in place and the opportunity to remove the device from the utility box.

These and other objects of the present invention will become apparent as hereinafter described in the summary, detailed description and the claims.

SUMMARY OF THE INVENTION

The present invention comprises a locator pin device for locating a utility box. The device comprises a locator pin support arm and an attachment means for removeably attaching the support arm to the utility box. The support arm is provided with one or more locator pins, so that when the device is attached to the utility box the locator pin or pins point in a direction away from the utility box. The support arm may be of any length and the locator pin or pins may be placed at any point or points on the support arm. Each locator pin is of a construction capable of penetrating a covering member such as drywall or paneling. When the covering member is placed in position over the utility box, the locator pin or pins will pierce the covering member and mark the location of the utility box. A template marked with holes to match the position of the locator pin or pins can then be placed over the pin or pins for the purpose of guiding a cutting tool or tracing a line to guide a cutting tool. This will permit an opening in the covering member to be made that allows access to the utility box and provides the operator with the ability to remove the device with the covering member in place. The covering member can then be secured around the utility box.

The attachment means removeably secures the support arm to the utility box. In the preferred embodiment, the attachment means is an attachment arm connected to the support arm. The ends of the attachment arm are curved to removeably clip on to the outside of the utility box. Other embodiments of the invention consist of an attachment arm that contains ends that removeably clip to the inside of the utility box or an attachment arm that contains a clamp at each of its ends that removeably attaches to the sides of the utility box. The attachment arm may be of any length, so a device may be made to fit utility boxes of varying dimensions. The support arm may also be curved at one or both ends to provide an additional attachment means to the utility box and to provide protection against slippage of the device that may occur when the covering member is placed into position. Curved support arm ends are particularly advantageous when the locator pin device is used in conjunction with a plastic utility box.

In the most preferred embodiment of the device, two locator pins are used and are positioned near each end of the support arm, or immediately prior to the curve, if any, at the ends of the support arm. The template is provided with openings that match the distance and aperture of the two locator pins. The template may be any shape so that it matches the dimensions of the particular utility box. The template may also be designed to accommodate a plunge drywall router so that drywall can be routed around the template without having to mark or remove the covering member.

BRIEF DESCRIPTION OF THE DRAWINGS

FIG. 1a is a perspective rear view of a preferred embodiment of the locator pin device of the present invention, FIG. 1b is a perspective front view of the embodiment of FIG. 1a;

DETAILED DESCRIPTION OF THE PREFERRED EMBODIMENT

Figure 1:
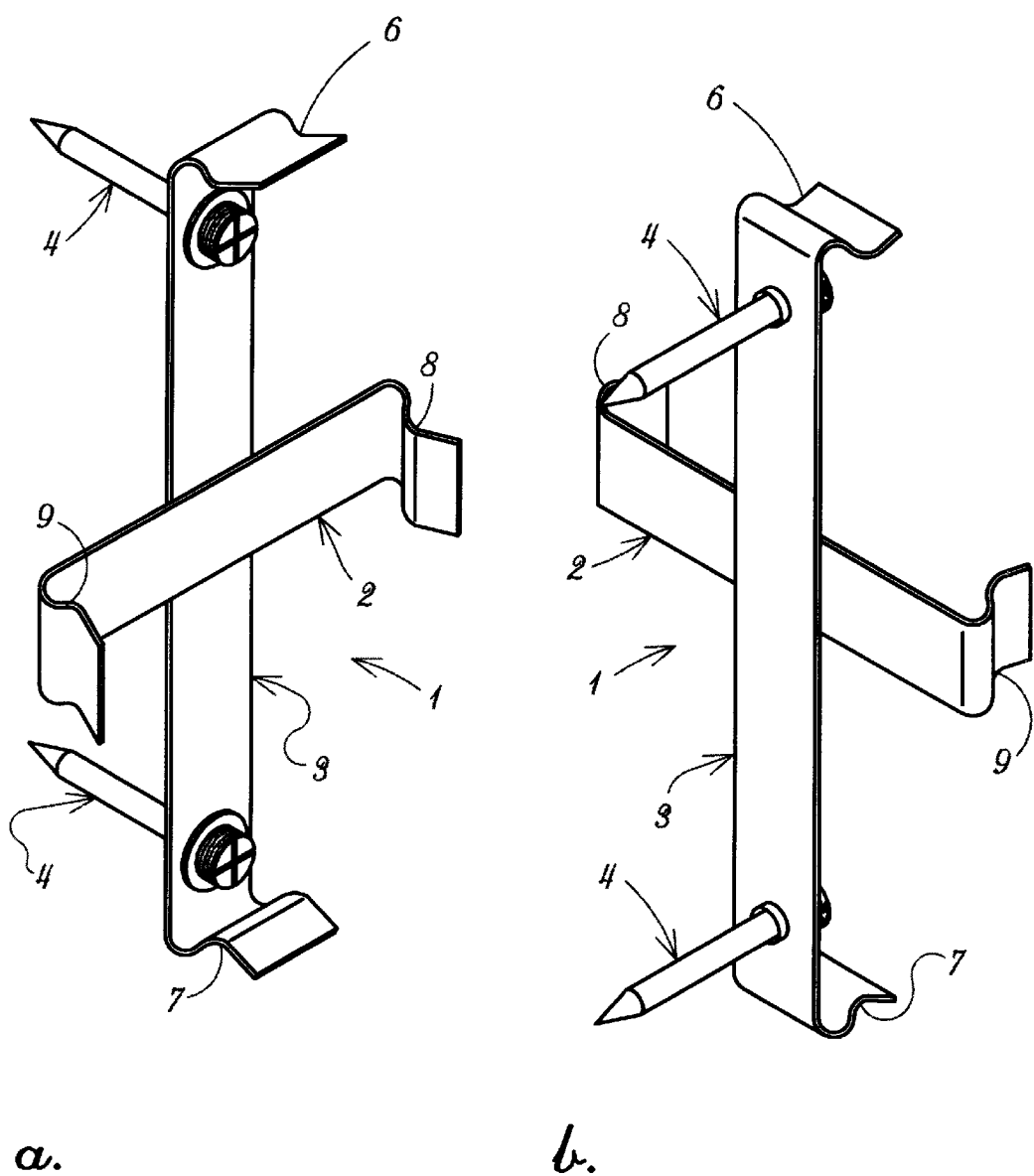

With reference to the drawings, shown in FIGS. 1a–b is a locator pin device 1 having an attachment arm 2 and a locator pin support arm 3. The attachment arm 2 is approximately 6.0 centimeters in length and 1.4 centimeters in width, although it may be of differing length to permit its use with different types of utility boxes (not shown), and of any width not greater than the width of the utility box 5. The support arm 3 is approximately 9.6 centimeters in length and 1.4 centimeters in width, although it may be of differing lengths to permit its use with different types of utility boxes (not shown), and of any width not greater than the length of the utility box. The attachment arm 2 and support arm 3 are preferably constructed of steel, iron, strong plastic or a similar sturdy material.

Figure 2:
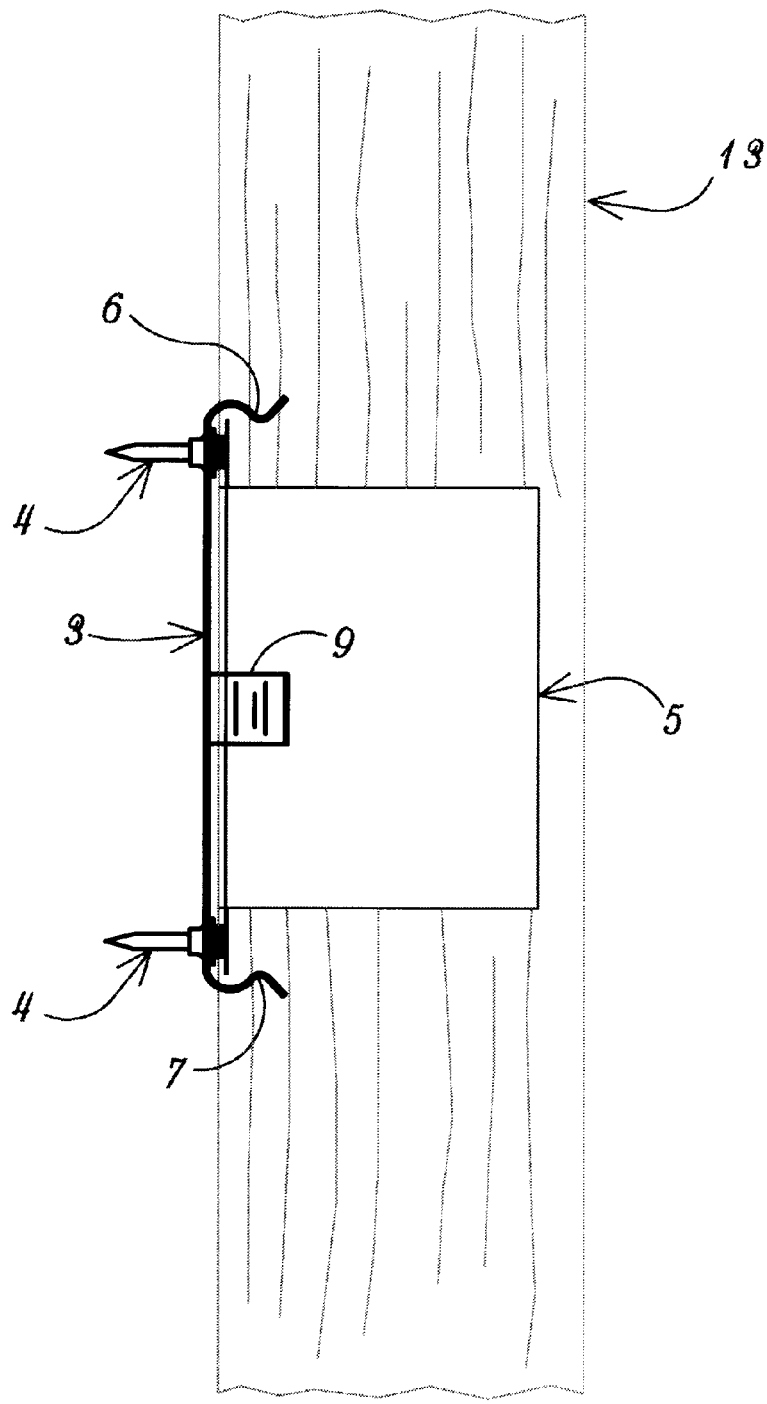
FIG. 2 is a side view of the embodiment of FIG. 1 attached to a utility box that is side mounted on a wood stud.
Figure 5:
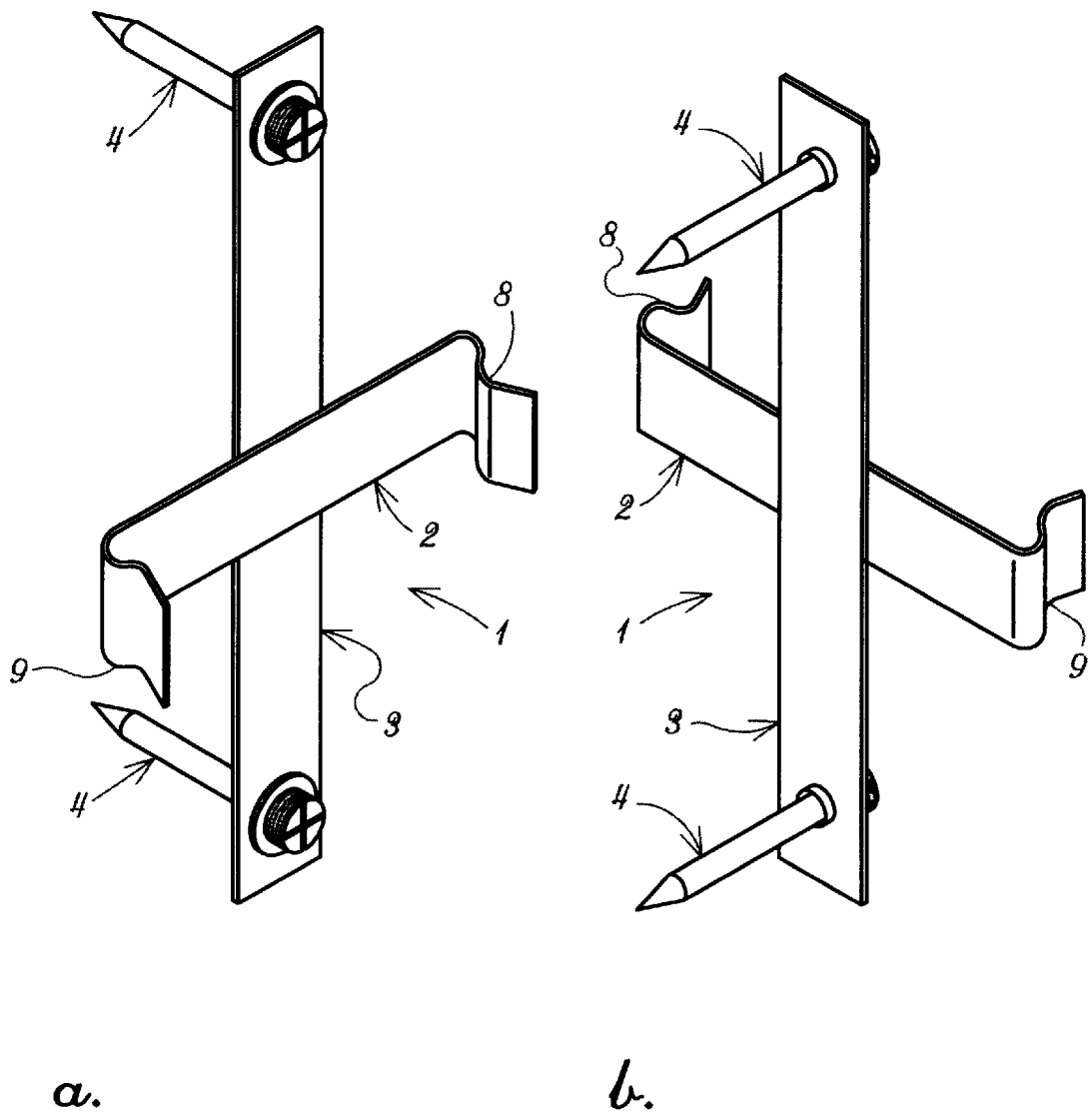
FIG. 5a is a perspective rear view of an alternative embodiment of the locator pin device of the present invention.
FIG. 5b is a perspective front view of an alternative embodiment of the locator pin device of the present invention.

Secured near the opposite ends of the support arm 3 are a pair of locator pins 4. The locator pins 4 are welded, riveted or otherwise secured to the support arm 3, although if a threaded locator pin (not shown) is used it may be screwed into the support arm 3. Each locator pin 4 extends approximately 2.5 centimeters beyond the support arm 3, although it may be of differing length so long as it can partially or completely pierce the particular covering member to be used. The support arm 3 preferably contains two curved ends 6 and 7 that fit over the ends of a utility box 5 as shown in FIG. 2 and help to removeably secure the device 1 to the utility box 5 and to prevent its slippage once secure. It should be noted that the curved ends 6 and 7 are not essential to the present invention and instead the support arm 3 may be formed with straight ends (FIGS. 5a–b). The curved ends 6 and 7 are preferred when the present invention is used with a utility box 5 constructed of a plastic material.

The attachment arm 2 contains two curved clamping ends 8 and 9 that principally secure the device in a removable condition to the outside of the utility box 5, as shown in FIG. 2.

Figure 3:
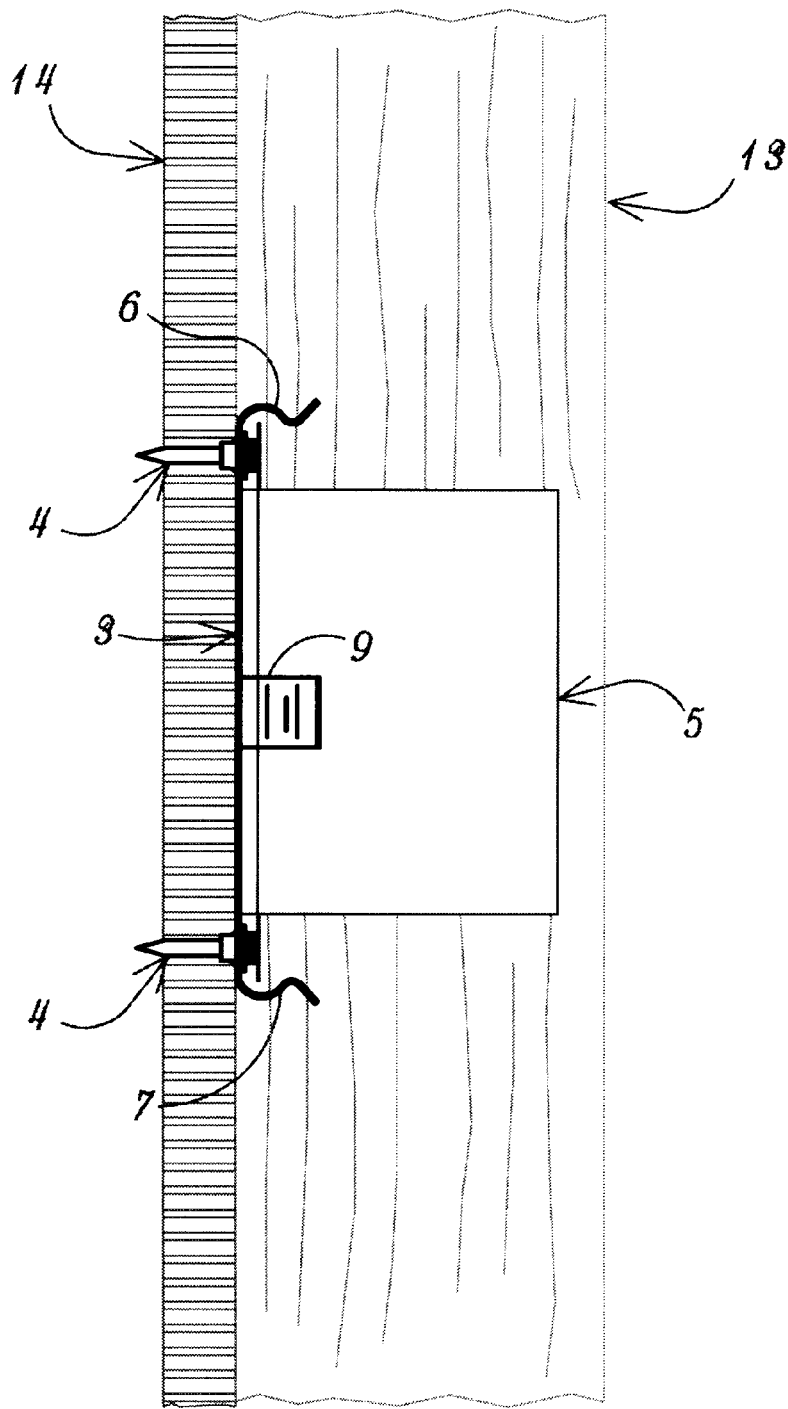
FIG. 3 is a side view similar to that of FIG. 2, but shown with a covering member positioned against the locating device and with the locator pins of the device perforating the covering member.

As shown in FIGS. 2 and 3, the utility box 5 is secured to a wooden stud 13. Once the utility box 5 has been installed, the device 1 is attached to the utility box 5, and a covering member 14 is placed over the device 1 so that the locator pins 4 completely pierce the covering member 14.

Figure 4:
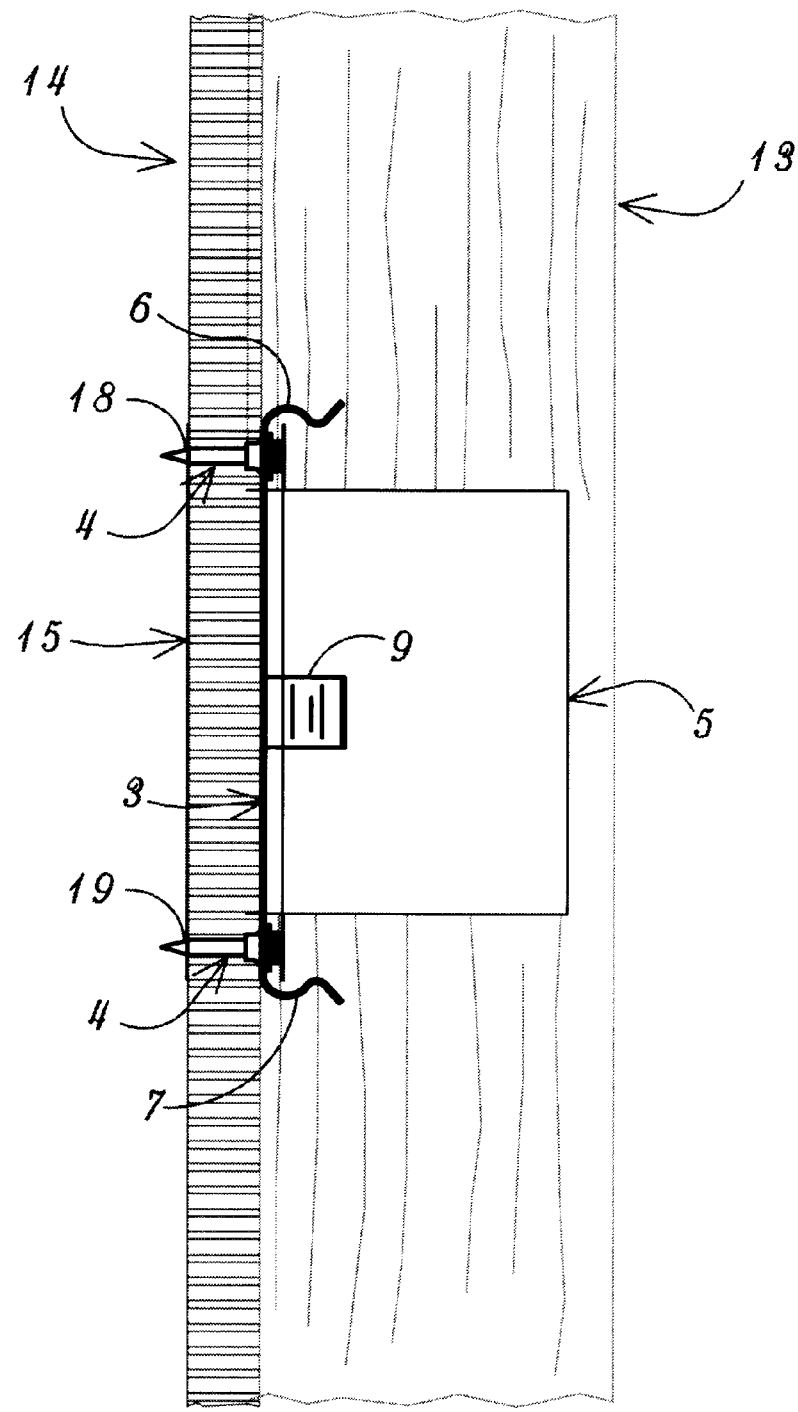
FIG. 4 is a side view similar to that of FIG. 3, but with a template placed upon the locator pins after they have perforated the covering member.

As shown in FIG. 4, a template 15 is provided to guide a cutting tool (not shown) or to trace the outline of the utility box 5 on the covering member 14. The template 15 is constructed of a piece of metal, plastic or other rigid material. The template 15 is provided with openings 18 and 19, which are sized to accommodate the locator pins 4.

Although the invention has been described with respect to a preferred embodiment thereof, it is to be understood that it is not to be so limited, since changes and modifications can be made therein which are within the full intended scope of this invention as defined by the appended claims. For example, it is anticipated that any size and any number of locator pins 4 may be used and that the locator pins need not be designed to completely penetrate the covering member 14, but may instead be used to score such member on the interior side to identify where it should be cut. In an alternative embodiment of the present invention, an alternative template (not shown) is used that is of a thickness sufficient to cover the ends of the locator pins 4. In this way, the template 15 may be used as a guide for a plunge router (not shown) or other cutting device.

It is also anticipated that the clamping ends 8 and 9 of the attachment arm 2 could comprise clamps (not shown) that clamp onto the inside of the utility box 5, or could comprise clips (not shown) that attach to the sides of the utility box. It is also anticipated that the support arm 3 not have curved ends as mentioned above.

What is claimed is:

1. A device for locating an access opening to a utility box concealed behind a covering member comprising:

(a) a locator pin assembly having an attachment means and a locator pin support arm that are connected together;

(b) said attachment means being utilized to removeably attach said device to the utility box;

(c) said locator pin support arm having at least one locator pin extending perpendicularly from the locator pin support arm in a direction pointed away from the utility box after attachment of the device to the utility box.

2. The device as in claim 1, further comprising a template for engaging the locator pin after it extends through the covering member, said template being utilized to provide guidance for a cutting tool.

3. The device as in claim 1 in which the attachment means comprises a clamping arm, said clamping arm having opposite ends that are curved to removeably clamp the outside of the utility box.

4. The device as in claim 1 in which the attachment means comprises a clamping arm, said clamping arm having opposite ends that removeably clamp to the inside of the utility box.

5. The device as in claim 1 in which said locator pin support arm has opposite ends that are curved to removeably clamp the outside of the utility box.

6. The device as in claim 1 in which said locator pin support arm has opposite ends that are curved to removeably clamp the inside of the utility box.

7. The device as in claim 1 in which there are at least a pair of locator pins extending perpendicularly from the locator pin support arm in a direction pointed away from the utility box after attachment of the device to the utility box.

8. The device as in claim 7 in which the pair of locator pins are positioned near each of the curved ends of said locator pin support arm.

9. The device as in claim 7, further comprising a template for engaging the locator pins after they extend through the covering member, said template being utilized to provide guidance for a cutting tool.

* * * * *